United States Patent
Alberth, Jr. et al.

(10) Patent No.: US 9,191,497 B2
(45) Date of Patent: Nov. 17, 2015

(54) METHOD AND APPARATUS FOR IMPLEMENTING AVATAR MODIFICATIONS IN ANOTHER USER'S AVATAR

(75) Inventors: William P. Alberth, Jr., Crystal Lake, IL (US); Dean Thorson, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 2302 days.

(21) Appl. No.: 11/955,786

(22) Filed: Dec. 13, 2007

(65) Prior Publication Data
US 2009/0158160 A1 Jun. 18, 2009

(51) Int. Cl.
*H04M 3/42* (2006.01)
*H04M 1/725* (2006.01)

(52) U.S. Cl.
CPC ............ *H04M 3/42* (2013.01); *H04M 1/72544* (2013.01); *H04M 2203/1025* (2013.01)

(58) Field of Classification Search
CPC .................. H04M 1/72544; H04M 2203/1025
USPC ................................................ 715/706, 751
See application file for complete search history.

(56) References Cited

U.S. PATENT DOCUMENTS

| 7,231,205 B2 | 6/2007 | Guyot et al. | |
|---|---|---|---|
| 2002/0165898 A1* | 11/2002 | Duffy et al. | 709/102 |
| 2004/0097221 A1* | 5/2004 | Lee | 455/419 |
| 2005/0101845 A1* | 5/2005 | Nihtila | 600/300 |
| 2005/0166154 A1* | 7/2005 | Wilson et al. | 715/751 |
| 2007/0113181 A1* | 5/2007 | Blattner et al. | 715/706 |
| 2008/0091692 A1* | 4/2008 | Keith et al. | 707/100 |

FOREIGN PATENT DOCUMENTS

| WO | 0217602 A1 | 2/2002 |
|---|---|---|
| WO | 2005074588 A2 | 8/2005 |

OTHER PUBLICATIONS

Bardzell, S. and Shankar, K. 2007. Video game technologies and virtual design: a study of virtual design teams in a metaverse. In Proceedings of the 2nd international Conference on Virtual Reality (Beijing, China, Jul. 22-27, 2007). R. Shumaker, Ed. Lecture Notes in Computer Science. Springer-Verlag, Berlin, Heidelberg, 607-616.*

* cited by examiner

*Primary Examiner* — Andrea Long
(74) *Attorney, Agent, or Firm* — Shumaker & Sieffert, P.A.

(57) ABSTRACT

A method and apparatus that implements avatar modifications to another user's avatar from a first mobile communication device is disclosed. The method may include selecting an avatar modification to relating to a user of a second mobile communication device based on input from a user, and sending a signal to initiate transmission of selected avatar modification to at least one of the second mobile communication device, an avatar management server, and a plurality of mobile communication devices wherein the user's avatar modification may be viewed by other mobile communication device users.

14 Claims, 6 Drawing Sheets

METHOD AND APPARATUS FOR IMPLEMENTING AVATAR MODIFICATIONS IN ANOTHER USER'S AVATAR

BACKGROUND OF THE DISCLOSURE

1. Field of the Disclosure

The disclosure relates to avatars for mobile communication devices.

2. Introduction

Avatars are becoming more popular with users of mobile communication devices. Currently, a user may modify his or her own avatars to show emotions, state of mind, presence, present status, etc. Thus, a user can modify his or her avatar to show information to others who view his or her avatar. However, conventional mobile communication devices do not permit one person to modify another person's avatar as it appears to other mobile communication device users.

SUMMARY OF THE DISCLOSURE

A method and apparatus that implements avatar modifications to another user's avatar from a first mobile communication device is disclosed. The method may include selecting an avatar modification to relating to a user of a second mobile communication device based on input from a user, and sending a signal to initiate transmission of selected avatar modification to at least one of the second mobile communication device, an avatar management server, and a plurality of mobile communication devices wherein the user's avatar modification may be viewed by other mobile communication device users.

A method and apparatus that manages avatar modifications in a mobile communication system is also disclosed. The method may include receiving an avatar modification from a first mobile communication device, the avatar relating to a user of a second mobile communication device, storing the avatar modification relating to the user of the second mobile communication device, receiving a signal to send the stored avatar modification to one or more mobile communication devices, and sending the avatar modification to the one or more mobile communication devices.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure may comprise a variety of embodiments, such as a method and apparatus and other embodiments that relate to the basic concepts of the disclosure. This disclosure may concern the ability of one user of a mobile communication device to select an avatar modification to another user's avatar. For example, given a social group, one member of the group may cause the rest of the group members to view a modification to a second member's avatar. Thus, the one mobile communication device user may modify the avatar of another mobile communication device user to show information to others who view that avatar.

The modification may show emotions, mood, state or mind, presence, present status, etc. on a user's avatar. As such, a user may modify or "mask" another user's avatar to show the user's avatar smiling, frowning, crying, sleeping, angry, laughing, etc.

The modification may expire after a specific duration or time, after it is modified by a user of another mobile communication device, or after it is modified or deleted by the user whose avatar has been modified. The user and/or the balance of the members of the user's group may query the user's avatar and discover who issued the modification.

Figure 1:
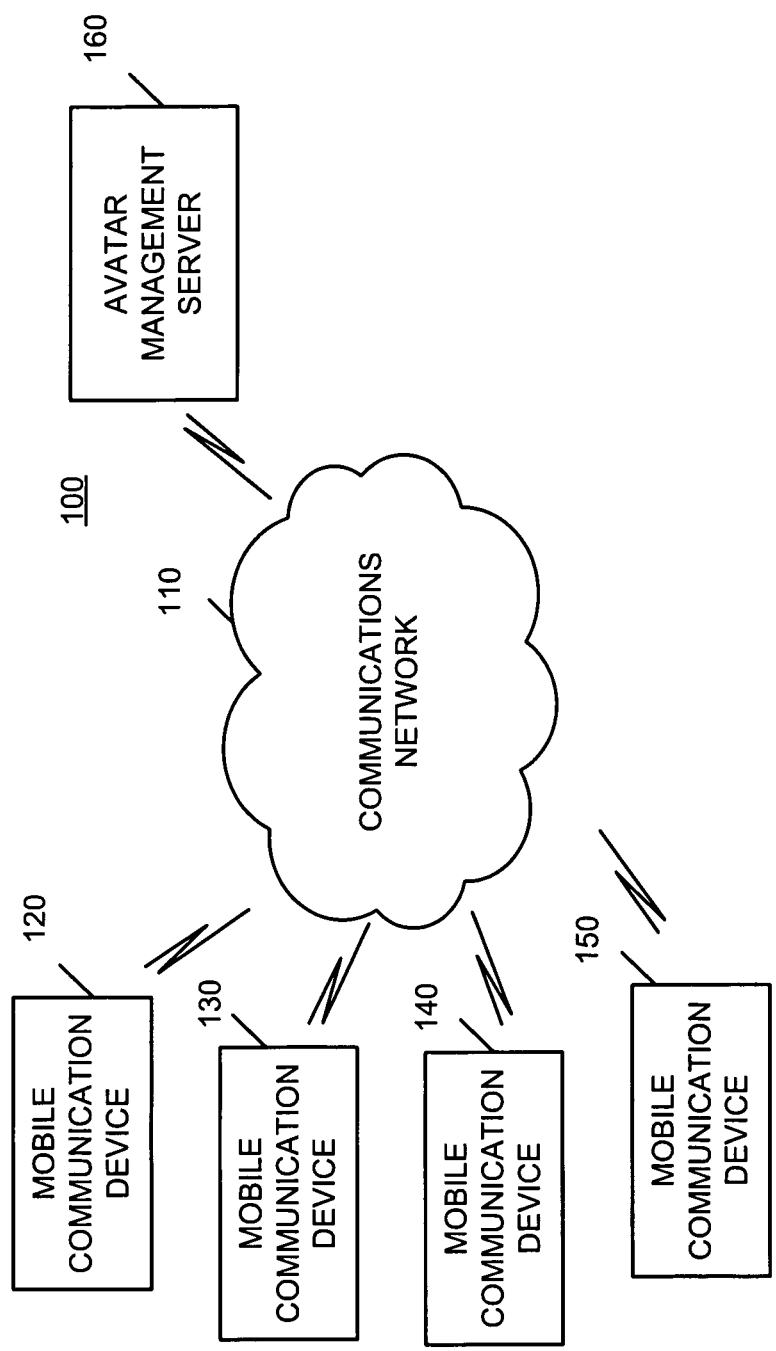
FIG. 1 illustrates a diagram of an exemplary mobile communications system in accordance with a possible embodiment of the disclosure.

FIG. 1 illustrates a diagram of an exemplary mobile communications system 100 in accordance with a possible embodiment of the disclosure. In particular, the mobile communications system 100 may include a plurality mobile communication devices 120, 130, 140, 150 and an avatar management server 160 connected through communications network 110.

Communications network 110 may represent any possible communications network that may handle telephonic communications, including wireless telephone networks, hardwired telephone networks, wireless local area networks (WLAN), the Internet, an intranet, etc., for example.

The mobile communication device 120, 130, 140, 150 may be a portable MP3 player, satellite radio receiver, AM/FM radio receiver, satellite television, portable music player, portable computer, wireless radio, wireless telephone, portable digital video recorder, cellular telephone, mobile telephone, personal digital assistant (PDA), or combinations of the above, for example. Although only four mobile communication devices 120, 130, 140, 150 are shown this is merely illustrative. There may be any number of mobile communication devices 120, 130, 140, 150 in the mobile communications system 100.

The avatar management server 130 may be a server, a computer, a personal computer, a portable computer, or a personal digital assistant, for example.

Figure 2:
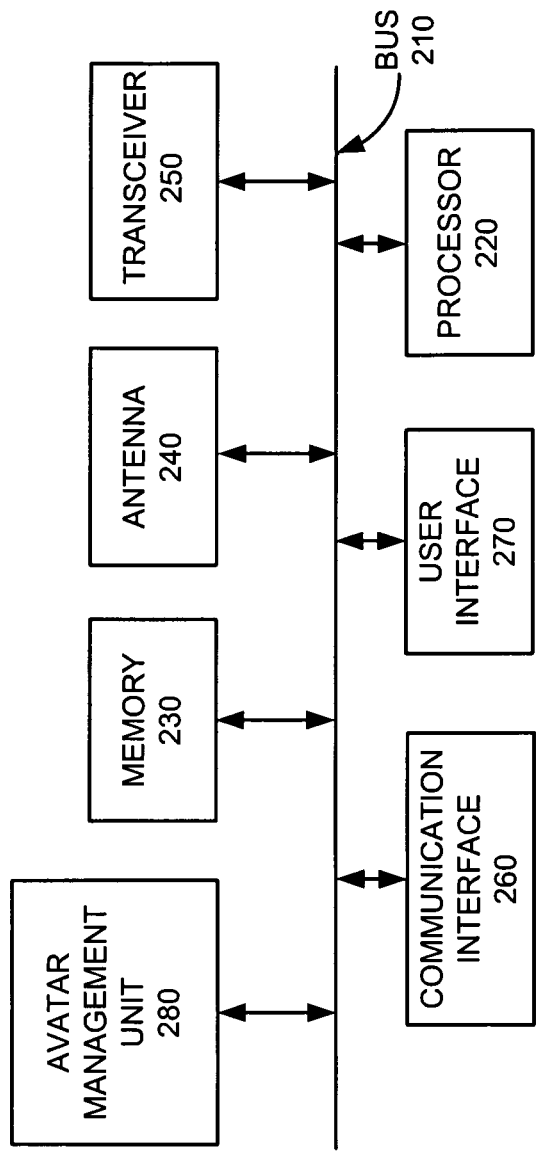
FIG. 2 illustrates a block diagram of an exemplary mobile communication device in accordance with a possible embodiment of the disclosure.

FIG. 2 illustrates a block diagram of an exemplary mobile communication device 120, 130, 140, 150 in accordance with a possible embodiment of the disclosure. The exemplary mobile communication device 120 may include bus 210, processor 220, memory 230, antenna 240, transceiver 250, communication interface 260, user interface 270, and avatar management unit 280. Bus 210 may permit communication among the components of the mobile communication device 120. For ease of discussion, we will only address one of the mobile communication devices 120 as all mobile communication devices may have the same capability under the embodiment of the disclosure.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Transceiver 250 may include one or more transmitters and receivers. The transceiver 250 may include sufficient functionality to interface with any network or communications station and may be defined by hardware or software in any manner known to one of skill in the art. The processor 220 is cooperatively operable with the transceiver 250 to support operations within the communications network 110. In the mobile communication device 120, the transceiver 250 may transmit and receive transmissions via one or more of the antennae 240 in a manner known to those of skill in the art.

Communication interface 260 may include any mechanism that facilitates communication via the communications network 110. For example, communication interface 260 may include a modem. Alternatively, communication interface 260 may include other mechanisms for assisting the transceiver 250 in communicating with other devices and/or systems via wireless or hardwired connections.

User interface 270 may include one or more conventional input mechanisms that permit a user to input information, communicate with other communication devices and/or present information to the user, such as a an electronic display, microphone, touchpad, keypad, keyboard, mouse, pen, stylus, voice recognition device, buttons, one or more speakers, etc.

The mobile communication device 120 may perform such functions in response to processor 220 and/or avatar management unit 280 by executing sequences of instructions contained in a computer-readable medium, such as, for example, memory 230. Such instructions may be read into memory 230 from another computer-readable medium, such as a storage device or from a separate device via communication interface 260.

The operations and functions of the avatar management unit 280 will be discussed in relation to the flowchart in FIG. 4.

Figure 3:
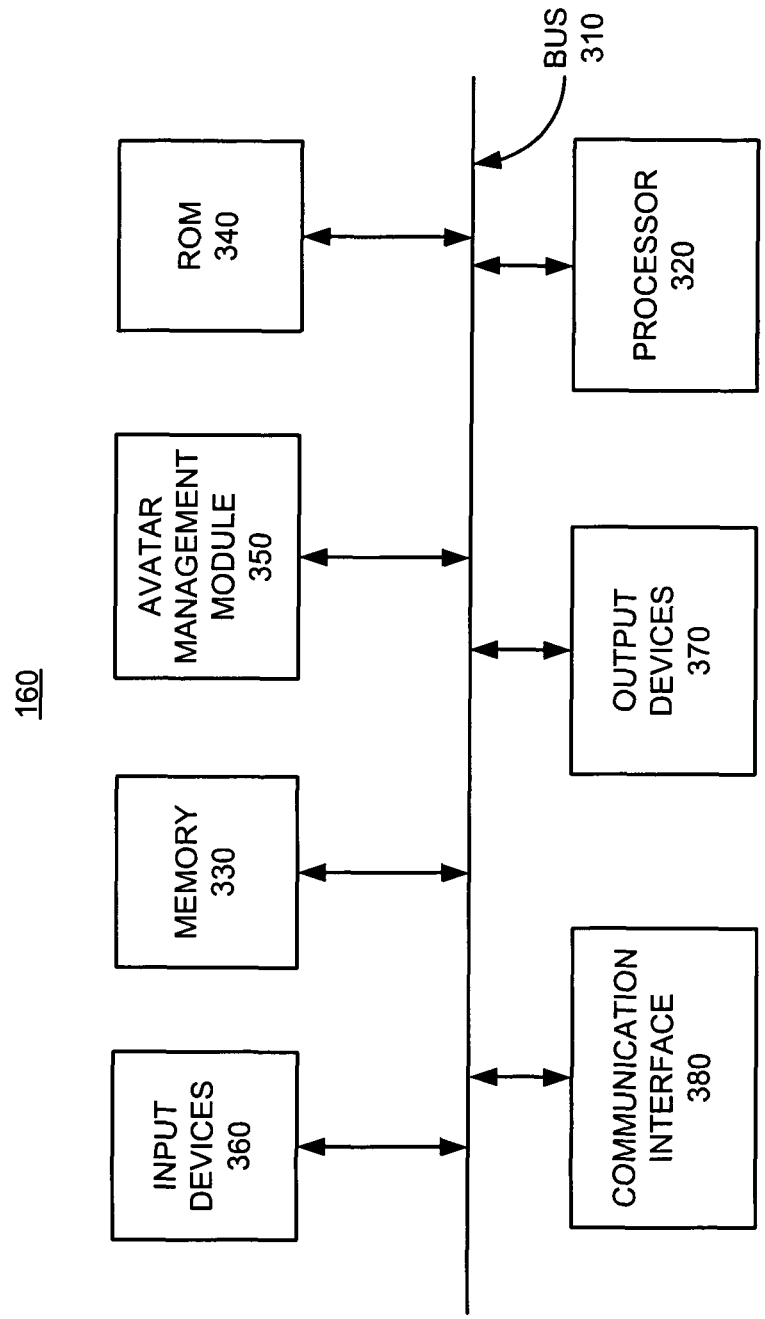
FIG. 3 illustrates an exemplary block diagram of an avatar management server in accordance with a possible embodiment of the disclosure.

FIG. 3 illustrates a block diagram of an exemplary avatar management server 160 in accordance with one possible embodiment of the disclosure. The avatar management server 160 may include may include bus 310, processor 320, memory 330, read only memory (ROM) 340, avatar management module 350, input devices 360, output devices 370, and communication interface 380. Bus 310 may permit communication among the components of the avatar management server 160.

Processor 320 may include at least one conventional processor or microprocessor that interprets and executes instructions. Memory 330 may be a random access memory (RAM) or another type of dynamic storage device that stores information and instructions for execution by processor 320. Memory 330 may also include a read-only memory (ROM) which may include a conventional ROM device or another type of static storage device that stores static information and instructions for processor 320.

Communication interface 380 may include any mechanism that facilitates communication via a network. For example, communication interface 380 may include a modem. Alternatively, communication interface 380 may include other mechanisms for assisting in communications with other devices and/or systems.

ROM 340 may include a conventional ROM device or another type of static storage device that stores static information and instructions for processor 320. A storage device may augment the ROM and may include any type of storage media, such as, for example, magnetic or optical recording media and its corresponding drive.

Input devices 360 may include one or more conventional mechanisms that permit a user to input information to the avatar management server 160, such as a keyboard, a mouse, a pen, a voice recognition device, touchpad, buttons, etc. Output devices 370 may include one or more conventional mechanisms that output information to the user, including a display, a printer, a copier, a scanner, a multi-function device, one or more speakers, or a medium, such as a memory, or a magnetic or optical disk and a corresponding disk drive.

The avatar management server 160 may perform such functions in response to processor 320 by executing sequences of instructions contained in a computer-readable medium, such as, for example, memory 330. Such instructions may be read into memory 330 from another computer-readable medium, such as a storage device or from a separate device via communication interface 380.

The avatar management server 160 illustrated in FIGS. 1 and 3 and the related discussion are intended to provide a brief, general description of a suitable communication and processing environment in which the invention may be implemented. Although not required, the invention will be described, at least in part, in the general context of computer-executable instructions, such as program modules, being executed by the avatar management server 160, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including personal computers, hand-held devices, multi-processor systems, microprocessor-based or programmable consumer electronics, and the like.

Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Figure 5:
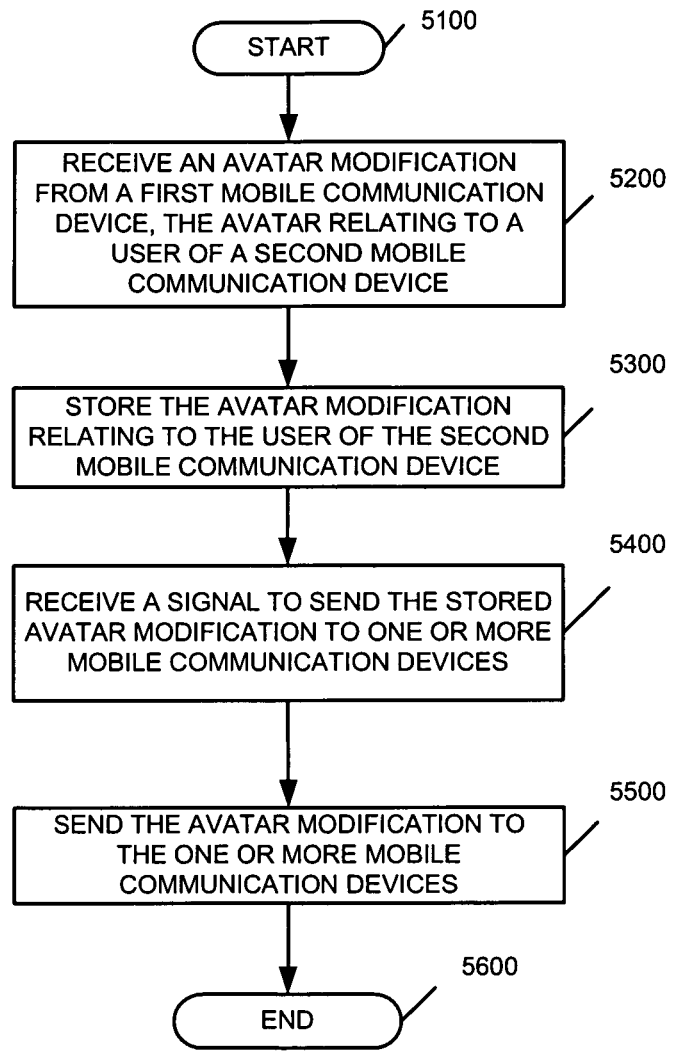
FIG. 5 is an exemplary flowchart illustrating one possible avatar management server process in accordance with one possible embodiment of the disclosure.

For illustrative purposes, the operation of the avatar management module 350 and the avatar management server process are described in the flowchart in FIG. 5 in relation to the block diagrams shown in FIGS. 1 and 3.

Figure 4:
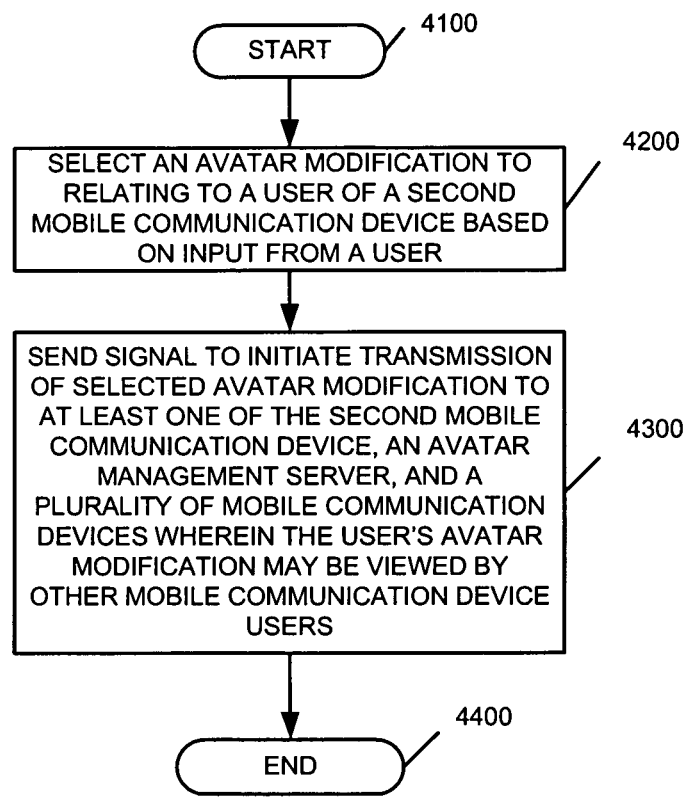
FIG. 4 illustrates an exemplary flowchart illustrating avatar management process in accordance with one possible embodiment of the disclosure.

FIG. 4 illustrates an exemplary flowchart illustrating one possible avatar management process in accordance with one possible embodiment of the disclosure. The process begins at step 4100 and continues to step 4200 where the avatar management unit 280 may select an avatar modification to relating to a user of a second mobile communication device 130 based on input from a user of the first communication device 120. The avatar modifications may preexist and be selected from a list or menu in the first mobile communication device 120 or from the avatar management server 160. Alternatively, the avatar modifications may be created by the user using a stylus, menu selections, etc. Thus, the user may create the avatar modification and select the created avatar modification for sending.

At step 4300, the avatar management unit 280 may send a signal using the communication interface 260 to initiate transmission of selected avatar modification to at least one of the second mobile communication device 130, an avatar management server, and a plurality of mobile communication devices 120, 130, 140, 150. In this manner, the user's avatar modification may be viewed by other mobile communication device users.

With respect to the avatar being viewed by a plurality of mobile communication device, the first mobile communication device and the second mobile communication device may be members of a mobile communication group. As such, one member of the group may cause other members of the group to view the second mobile communication device user's avatar modification.

In addition, another mobile communication device member may further modify the second mobile communication device user's avatar. Thus, if Matthew or another member in the group subsequently determines that Megan is in a better mood, than he can send an avatar modification to show Megan having a smile on her face (or smiling mask).

The avatar modification may continue until it is changed or it may expire after a predetermined time period, for example. The process then goes to step 4400 and ends.

FIG. 5 is an exemplary flowchart illustrating one possible avatar management server process in accordance with one possible embodiment of the disclosure. The process begins at step 5100 and continues to step 5200 where the avatar management module 350 may receive an avatar modification from a first mobile communication device, the avatar relating to a user of a second mobile communication device.

At step 5300, the avatar management unit 350 may store the avatar modification relating to the user of the second mobile communication device. At step 5400, the avatar management unit 350 may receive a signal to send the stored avatar modification to one or more mobile communication devices.

At step 5500, the avatar management unit 350 may send the avatar modification to the one or more mobile communication devices. The avatar management unit 350 may also receive a second avatar modification to the avatar of the second mobile communication device 130. In this manner, the avatar management unit 350 may update the avatar modification of the avatar of the second mobile communication device user and store it in memory 430, for example. The process then goes to step 5600 and ends.

Figure 6C:
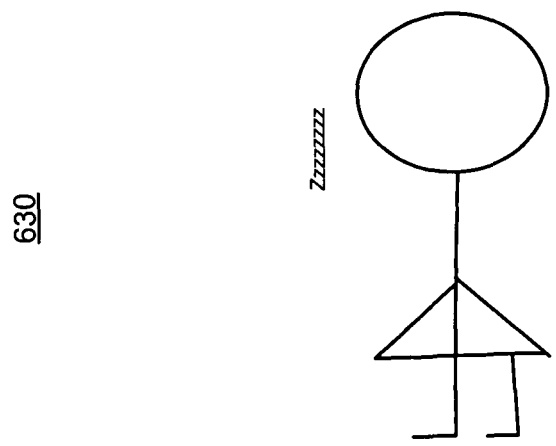
FIG. 6 illustrates exemplary avatar modifications in accordance with one possible embodiment of the disclosure.
Figure 6B:
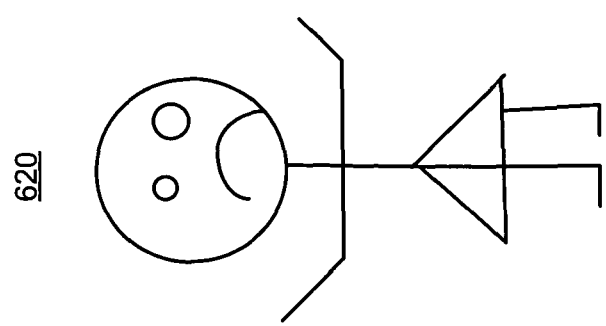
Figure 6A:
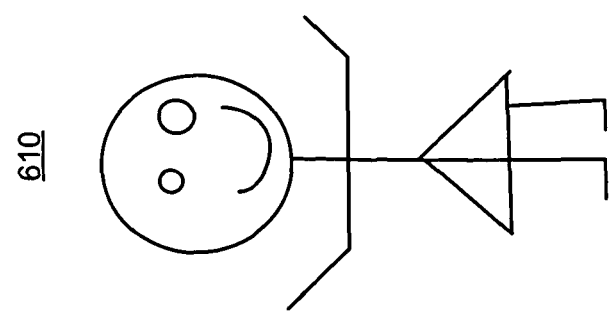

FIG. 6 illustrates exemplary avatar modifications in accordance with one possible embodiment of the disclosure. FIG. 6A shows an exemplary "smiling" avatar modification 610 indicating that the user of another (or second) mobile communication device is happy or in a good mood, for example. FIG. 6B shows an exemplary "frowning" avatar modification 620 indicating that the user of another (or second) mobile communication device is sad or in a bad mood, for example. FIG. 6C shows an exemplary "sleeping" avatar modification 630 indicating that the user of another (or second) mobile communication device is tired or sleeping, for example. Other avatar modifications may also be used that may show emotions, mood, state or mind, presence, present status, etc. on a user's avatar. As such, a user may additionally modify or "mask" another user's avatar to show the user's avatar crying, angry, laughing, with a broken arm, sprained ankle, etc.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The modifications to the avatar may be generally available to the public, or may only be available to a group that has agreed to share access to some personal information.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the avatar management unit 280 in FIG. 2, and the avatar management module 350 in FIG. 3, each processing the content in various possible ways. It does not necessarily need to be one system used by all end users. Accordingly, the appended claims and their legal equivalents should only define the disclosure, rather than any specific examples given.

We claim:

1. A method for implementing avatar modifications to another user's avatar from a first mobile communication device, comprising:
   selecting, at the first mobile communication device, an avatar modification relating to a user of a second mobile communication device;
   sending a signal to initiate transmission of the selected avatar modification to at least one of the second mobile communication device, an avatar management server, and a plurality of mobile communication devices to show the avatar modification on at least one third mobile communication device; and
   wherein the avatar modification expires after a predetermined time period.

2. The method of claim 1, wherein the selected avatar modification shows one of emotions, mood, state or mind, presence, and present status, on the second communication device user's avatar.

3. The method of claim 1, further comprising:
   creating the avatar modification, wherein the created avatar modification is selected as the avatar modification relating to the user of the second mobile communication device.

4. The method of claim 1, wherein the first mobile communication device and the second mobile communication device are members of a mobile communication group, one member of the group causing other members of the group to view the second mobile communication device user's avatar with modification.

5. The method of claim 4, wherein another member of the mobile communication group may modify the avatar modification.

6. The method of claim 1, wherein the selected avatar modification shows the user's avatar as one of smiling, frowning, crying, sleeping, angry, and laughing.

7. The method of claim 1, wherein each mobile communication device is one of a portable MP3 player, a satellite radio receiver, an AM/FM radio receiver, a satellite television, a portable music player, a portable computer, a wireless radio, a wireless telephone, a portable digital video recorder, a cellular telephone, a mobile telephone, and a personal digital assistant (PDA).

8. A mobile communication device that implements avatar modifications to another user's avatar, comprising:
   a processor;
   a user interface;
   a communication interface;
   an avatar management unit that selects an avatar modification relating to a user of a second mobile communication device based on input from a user on the user interface, and sends a signal using the communication interface to initiate transmission of the selected avatar modification to at least one of the second mobile communication device, an avatar management server, and a plurality of mobile communication devices to show the avatar modification on at least one third mobile communication device; and
   wherein the avatar modification expires after a predetermined time period.

9. The mobile communication device of claim 8, wherein the selected avatar modification shows one of emotions, mood, state or mind, presence, and present status, on the second communication device user's avatar.

10. The mobile communication device of claim 8, wherein the avatar management unit receives an avatar modification created by a user, wherein the created avatar modification is selected based on the user's input.

11. The mobile communication device of claim 8, wherein the first mobile communication device and the second mobile communication device are members of a mobile communication group, one member of the group causing other members of the group to view the second mobile communication device user's avatar modification.

12. The mobile communication device of claim 11, wherein another member of the mobile communication group may modify the avatar modification.

13. The mobile communication device of claim 8, wherein the selected avatar modification shows the user's avatar as one of smiling, frowning, crying, sleeping, angry, and laughing.

14. The mobile communication device of claim 8, wherein the mobile communication device is one of a portable MP3 player, a satellite radio receiver, an AM/FM radio receiver, a satellite television, a portable music player, a portable computer, a wireless radio, a wireless telephone, a portable digital video recorder, a cellular telephone, a mobile telephone, and a personal digital assistant (PDA).

* * * * *